United States Patent [19]

Kaku et al.

[11] Patent Number: 5,442,656
[45] Date of Patent: Aug. 15, 1995

[54] TIMING EXTRACTION DEVICE AND DATA TRANSMISSION DEVICE USING THE TIMING EXTRACTION DEVICE

[75] Inventors: Takashi Kaku; Noboru Kawada, both of Kawasaki, Japan

[73] Assignee: Fujitsu Limited, Kanagawa, Japan

[21] Appl. No.: 9,108

[22] Filed: Jan. 26, 1993

[30] Foreign Application Priority Data

Jan. 27, 1992 [JP] Japan .................. 4-012009

[51] Int. Cl.$^6$ .................................. H04L 27/06
[52] U.S. Cl. ........................ 375/354; 375/344; 375/327; 329/307
[58] Field of Search ............ 375/81, 20, 119, 120, 375/106, 94, 97; 329/307, 325, 360; 370/105.3; 307/269, 518; 328/72, 133, 139

[56] References Cited

U.S. PATENT DOCUMENTS

| | | | |
|---|---|---|---|
| 4,458,355 | 7/1984 | Motley et al. | 375/81 |
| 4,831,637 | 5/1989 | Lawrence et al. | 307/269 |
| 4,941,155 | 7/1990 | Chuang et al. | 375/84 |
| 4,943,982 | 7/1990 | O'Neil, II et al. | 375/81 |
| 5,022,048 | 6/1991 | Kingston et al. | 328/133 |
| 5,031,197 | 7/1991 | Hespelt et al. | 375/106 |
| 5,255,290 | 10/1993 | Anvari | 375/97 |

FOREIGN PATENT DOCUMENTS

| | | |
|---|---|---|
| 0205378 | 12/1986 | European Pat. Off. . |
| 0355587 | 2/1990 | European Pat. Off. . |
| 62-108643 | 5/1987 | Japan . |
| 63-156460 | 6/1988 | Japan . |
| 3-88537 | 4/1991 | Japan . |

*Primary Examiner*—Stephen Chin
*Assistant Examiner*—Timothy J. May

[57] ABSTRACT

In a timing extraction device coupled to a demodulator which derives a real signal component and an imaginary signal component from a signal received via a transmission line, a band-pass filter extracts a ½-Nyquist frequency from either the real signal component or the imaginary signal component. The ½-Nyquist frequency includes two symmetrical frequency components. A vector conversion unit processes the ½-Nyquist frequency so that a vector signal corresponding to one of the two symmetrical frequency components of the ½-Nyquist frequency is output from the vector conversion unit. A square multiplier squares the vector signal received from the vector conversion unit and thereby generates a phase error signal indicating timing information concerning the analog signal. The phase error signal has an angle which is double an angle of the vector signal.

16 Claims, 12 Drawing Sheets

BEFORE 2θ

| 960 Hz SIGNAL (0°) | 90° | 180° | 90° | 360° |
|---|---|---|---|---|
| 960 Hz SIGNAL (180°) | -90° | 0° | 90° | 180° |
| BAUD-RATE SIGNAL | 180° | 360° | 180° | 360° |

AFTER 2θ

| 960 Hz SIGNAL (0°) | 180° | 360° | 180° | 360° |
|---|---|---|---|---|
| 960 Hz SIGNAL (180°) | 180° | 360° | 180° | 360° |
| BAUD-RATE SIGNAL | 180° | 360° | 180° | 360° |

FIG. 11

| BLOCK | FIG. 1 | | PRESENT INVENTION (FIG. 3) | | REDUCTION RATE (NUMBER OF STEPS) | REDUCTION RATE (RAM) |
|---|---|---|---|---|---|---|
| | NUMBER OF STEPS | RAM | NUMBER OF STEPS | RAM | | |
| ROF | 1672 | 418 | 210 | 210 | 1/8 | 1/2 |
| AGC | 64 | 1 | 32 | 1 | 1/2 | NO REDUCTION |
| BPF1 1/12 | 64 | 4 | 32 | 4 | 1/2 | NO REDUCTION |
| BPF2 | 8 | 0 | 2 | 0 | -6 CYCLES | NO REDUCTION |
| VECTOR | 32 | 2 | 0 | 0 | -32 CYCLES | -2 WORDS |
| ( )² | 0 | 1 | 0 | 1 | NO REDUCTION | NO REDUCTION |
| | 0 | 0 | 8 | 0 | +8 CYCLES | NO REDUCTION |
| TOTAL | 1840 | 426 | 284 | 216 | ABOUT 1/7 | 1/2 |

TIMING EXTRACTION DEVICE AND DATA TRANSMISSION DEVICE USING THE TIMING EXTRACTION DEVICE

BACKGROUND OF THE INVENTION

1. Field of the Invention

The present invention generally relates to timing extraction devices used in modems for transferring data via communications lines, such as telephone lines and dedicated lines.

2. Description of the Related Art

A modem (modulator/demodulator) is a data transmission device and is widely used in an analog line utilizing the voice band. In such a modem, it is necessary to extract information concerning timing for modulation performed at the transmitter from a signal received via the analog line in order to reproduce the original data at the receiver. In practice, there is a frequency offset which functions to affect the timing extracting operation at the receiver. Hence, it is necessary to stably extract timing information from the received signal irrespective of the existence of a frequency offset.

Figure 1:
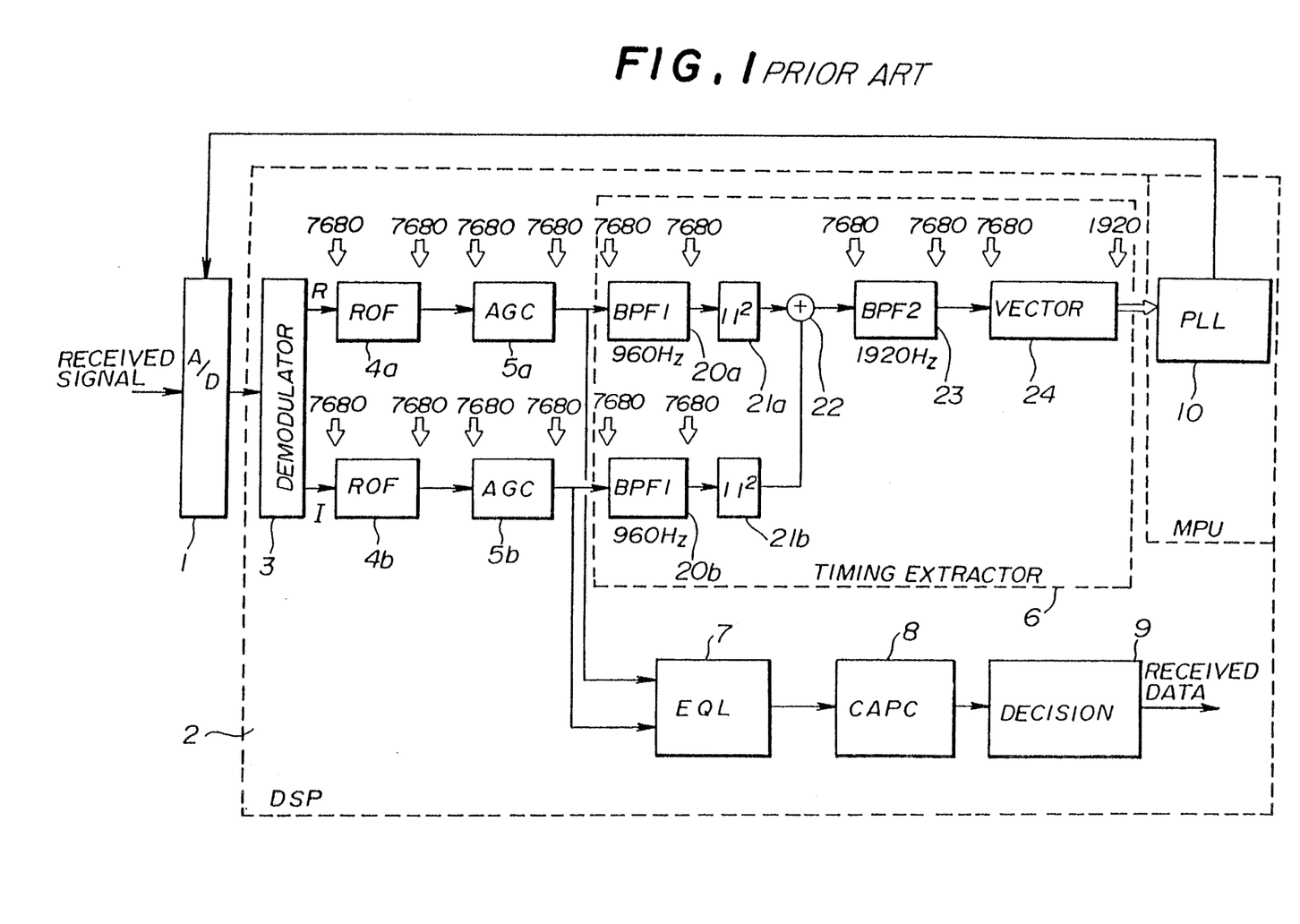
FIG. 1 is a block diagram of a modem utilizing a related timing extraction device.

FIG. 1 shows a related modem utilizing a digital signal processor (DSP). The modem employs a modulation speed (baud rate) of 1920 bauds, a sampling frequency of 7680 Hz (equal to four times the baud rate), a frequency of 1920 Hz for performing timing control by means of a PLL (Phase-Locked Loop). A signal received via an analog line is sampled at a frequency of 7680 Hz by an A/D (Analog-to-Digital) converter 1. A digital signal thus generated is applied to a DSP (Digital Signal Processor) 2.

A demodulator 3 of the DSP 2 demodulates the digital signal from the A/D converter 1 and thereby generates a demodulated real component R and a demodulated imaginary component I. The waveforms of the demodulated real component R and the demodulated imaginary component I are respectively shaped by roll-off filters (BPF1) 4a and 4b. Then, the waveform-shaped demodulated real and imaginary components R and I are regulated at fixed levels by AGC (Automatic Gain Control) circuits 5a and 5b, respectively. The output signals of the AGC circuits 5a and 5b are applied to a timing extractor 6 and an automatic equalizer 7.

The timing extractor 6 includes band-pass filters 20a and 20b, which extract ½-Nyquist frequency components from the output signals of the AGC circuits 5a and 5b. In the example being considered, the Nyquist frequency is 1920 Hz, and the ½-Nyquist frequency is 980 Hz. The ½-Nyquist frequency components from the band-pass filters 20a and 20b are respectively squared by square multipliers 21a and 21b. The output signals of the square multipliers 21a and 21b are added to each other by an adder 22. The output signal of the adder 22 is applied to a band-pass filter (BPF2) having a center frequency of 1920 Hz. The bandpass filter 23 extracts a timing signal component having a frequency of 1920 Hz from the output signal of the adder 22. The 1920 Hz timing signal component from the band-pass filter 23 is converted into a vector signal by a vector conversion unit 24. The vector signal from the vector conversion unit 24 is a phase error signal having a frequency of 1920 Hz and indicating an error (advance or delay) in the phase of the timing signal component.

The timing error signal from the vector conversion unit 24 is applied to a secondary PLL unit 10 for phase decision, the unit 10 being provided in a MPU (Microprocessor Unit). The PLL unit 10 functions as a phase synchronizing unit, and generates a sampling clock signal (internal timing signal) having a frequency of 7880 Hz. The automatic equalizer 7 equalizes the waveforms of the output signals from the AGC circuits 5a and 5b, and generates an equalized signal. A carrier phase correction unit (CAPC) 8 corrects the carrier phase of the output signal of the automatic equalizer 7. The output signal of the unit 8 is applied to a decision unit 9, which generates received data.

The structure shown in FIG. 1 is capable of stably extracting timing information from the received signal. In practice, the operations of the structural elements of the DSP 2 shown in FIG. 1 are realized by software, and data to be operated and the results of operations are stored in a RAM (Random Access Memory).

The band-pass filter 23 is a Nyquist extraction filter and has an extraction frequency equal to the baud rate (1920 Hz). Hence, the sampling frequency should be higher than twice the baud rate according to the sampling thereof and should be an integer multiple of the baud rate. With the above in mind, the speed (7680 Hz) equal to four times the baud rate (1920 Hz) is used as the sampling frequency of the Nyquist extraction filter 23. Hence, it is necessary to operate all the structural elements located at stages before the Nyquist extraction filter 23 at a frequency of 7680 Hz equal to four times the baud rate, as shown in FIG. 1.

Hence, the structure shown in FIG. 1 has the following disadvantages. A large amount of operation and a large RAM capacity are needed to realize the structural elements operating at a frequency of 7680 Hz. In practice, many DSPs are needed to a large amount of operation, and many RAM chips are needed to provide a large storage capacity. Hence, it is very difficult to provide compact, less-expensive modems.

SUMMARY OF THE INVENTION

It is a general object of the present invention to provide a timing extraction device in which the above disadvantages are eliminated.

A more specific object of the present invention is to provide a timing extraction device capable of operating at a reduced frequency without a Nyquist extraction filter.

The above objects of the present invention are achieved by a timing extraction device coupled to a demodulator which derives a real signal component and an imaginary signal component from a signal received via a transmission line, the timing extraction device comprising: first means for extracting a ½-Nyquist frequency from one of the real signal component and the imaginary signal component, the ½-Nyquist frequency including two symmetrical frequency components; second means, coupled to the first means, for executing a vector process on the ½-Nyquist frequency so that a vector signal corresponding to one of the two symmetrical frequency components is selected from the ½-Nyquist frequency; and third means, coupled to the second means, for squaring the vector signal from the second means and thereby generating a phase error signal indicating timing information concerning the signal received via the transmission line, the phase error signal having an angle equal to twice an angle of the vector signal.

The above objects of the present invention are also achieved by a timing extraction device coupled to a demodulator which derives a real signal component and an imaginary signal component from a signal received via a transmission line, the timing extraction device comprising: first means for extracting first and second ½-Nyquist frequencies from the real signal component and the imaginary signal component, each of the ½-Nyquist frequencies including two symmetrical frequency components; second means, coupled to the first means, for executing a vector process on the first and second ½-Nyquist frequencies so that first and second vector signals, each corresponding to one of the two symmetrical frequency components, are respectively selected from the ½-Nyquist frequencies; third means, coupled to the second means, for squaring the first and second vector signals and thereby generating first and second phase error signals respectively indicating timing information concerning the signal received via the transmission line, the first and second phase error signals respectively having angles equal to twice angles of the first and second vector signals; and fourth means, coupled to the third means, for adding the first and second phase error signals to each other and thereby generating a finalized phase error signal.

Another object of the present invention is to provide a data transmission device having the abovementioned timing extraction device.

This object of the present invention is achieved by a deta transmission device comprising: an A/D converter converting an analog signal received via a transmission line into a digital signal; the abovementioned timing extraction device coupled to a demodulator which derives a real signal component and an imaginary signal component from the digital signal, the timing extraction device generating a phase error signal; a controller controlling a sampling frequency of the A/D converter on the basis of the phase error signal; and a data reproducing system reproducing original data from the real signal component and the imaginary signal component.

The above object of the present invention is also achieved by a data transmission device comprising: an A/D converter converting an analog signal received via a transmission line into a digital signal; the abovementioned timing extraction device coupled to a demodulator which derives a real signal component and an imaginary signal component from the digital signal, the timing extraction device generating a finalized phase error signal; a controller controlling a sampling frequency of the A/D converter on the basis of the finalized phase error signal; and a data reproducing system reproducing original data from the real signal component and the imaginary signal component.

BRIEF DESCRIPTION OF THE DRAWINGS

Other objects, features and advantages of the present invention will become more apparent from the following detailed description when read in conjunction with the accompanying drawings, in which:

FIGS. 8A, 8B and 8C are diagrams showing the operation of the frequency shifter shown in FIG. 7A;

DESCRIPTION OF THE PREFERRED EMBODIMENTS

Figure 2A:
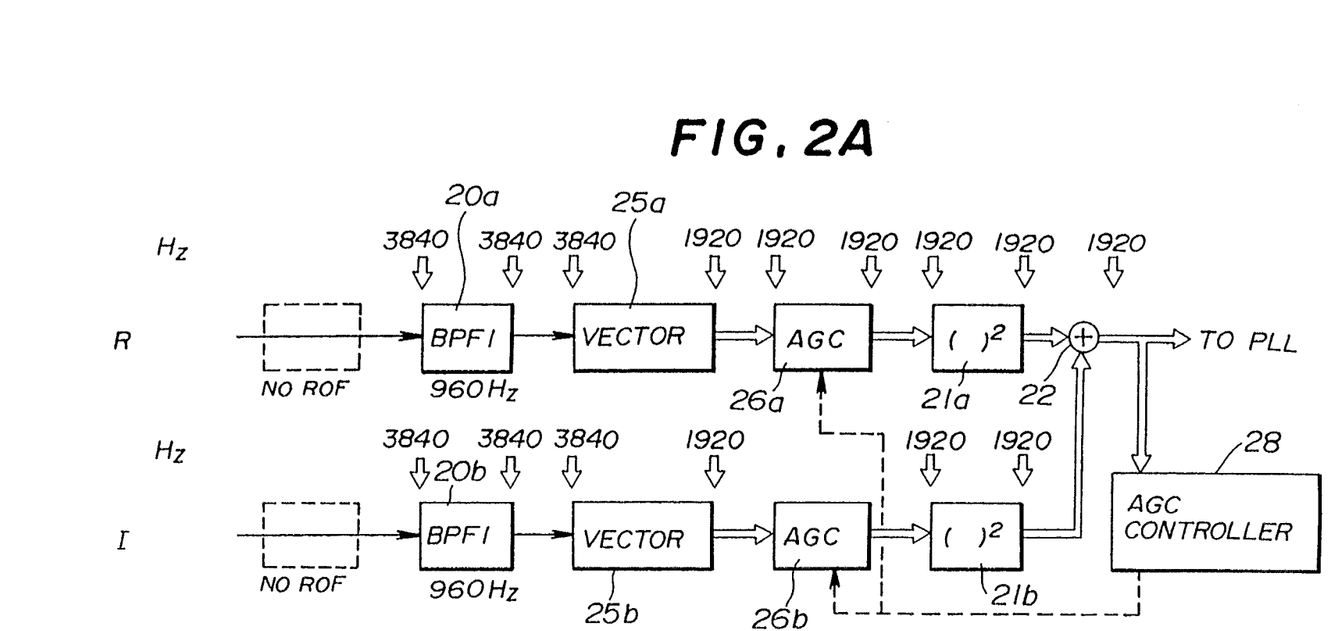
FIG. 2A is a block diagram of an overview of the present invention.

FIG. 2A is a block diagram showing an overview of the present invention. In FIG. 2A, parts that are the same as parts shown in FIG. 1 are given the same reference numbers. The demodulated real component R and the demodulated imaginary component I are respectively applied to the band-pass filters 20a and 20b.

Figure 2B:
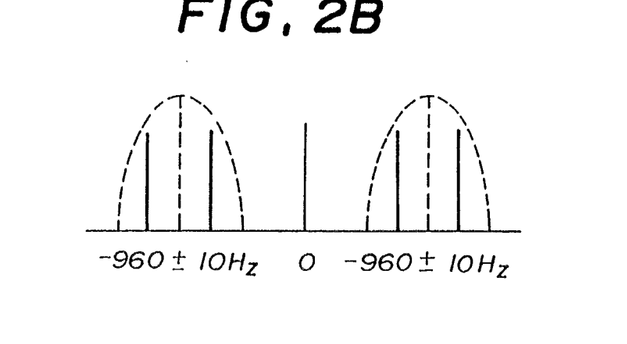
FIGS. 2B and 2C are frequency spectra showing the basic operation of the present invention.

As shown in FIG. 2B, a ½-Nyquist frequency component extracted from the demodulated real component R or the demodulated imaginary component I is a scaler signal having two frequency components symmetrical to each other with respect to the origin (0 Hz). It will be noted that $\pm 10$ Hz frequency components are offset signal components. The broken curved lines shown in FIG. 2B indicate the filter characteristics of the band-pass filters 20a and 20b. The scaler signals as shown in FIG. 2B are respectively applied to vector conversion units 25a and 25b, which respectively convert the scaler signals into vector signals.

Figure 2C:
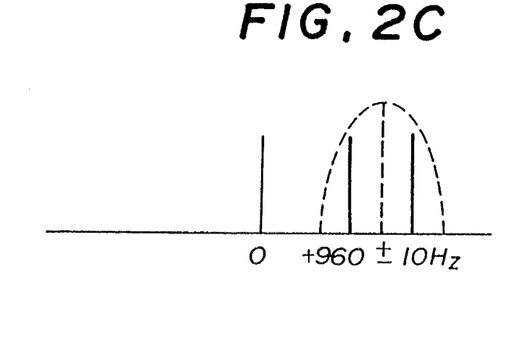

As shown in FIG. 2C, the vector signal is one of the two symmetrical frequency components of the scaler signal. For example, the positive frequency components are respectively extracted by the vector conversion units 25a and 25b. AGC circuits 26a and 26 function to maintain the amplitudes of the frequency components from the vector conversion units 25a and 25b at fixed levels. The AGC circuits 26a and 26b may be omitted as necessary. For example, if there are small differences between the amplitudes of signals received via different analog transmission lines, the AGC circuits 26a and 26b can be omitted. However, in practice, it is preferable to use the AGC circuits 26a and 26b.

The output signals of the AGC circuits 26a and 26b are applied to the square multipliers 21a and 21b. Each of the output signals of the vector conversion units 25a and 25b is a positive frequency signal, which is a vector signal $A(\cos\theta + j\sin\theta) = Ae^{j\theta}$ where A is the amplitude thereof and $\theta$ is the angle forming the real and imaginary components. The square multiplier 21a receives the vector signal $Ae^{j\theta}$, and generates a signal $A^2e^{j2\theta}$ by squaring the received signal. The square multiplier 21b operates in the same manner as the square multiplier 21b. The signal $A^2e^{j2\theta}$ is a phase error signal having a baud rate of 1920 Hz. The adder 22 adds the phase error signals from the square multipliers 21a and 21b to each other, and generates a finalized phase error signal, which is applied to the PLL circuit 10 (FIG. 1) for phase decision. Alternatively, it is possible to directly apply one of the two phase error signals to the PLL circuit. However, in practice, it is preferable to employ the structure shown in FIG. 2A in order to eliminate arbitrariness of data and the phase of the carrier signal.

It should be noted that the essence of timing extraction is not to extract the baud rate frequency itself but to extract a phase error signal at the baud rate. The present invention does not need the Nyquist extraction filter 23 shown in FIG. 1 having a sampling frequency equal to four times the baud rate.

In practical applications, it is preferable to regulate the amplitudes of the vector signals from the vector conversion units 25a and 25b by the AGC circuits 26a and 26b, as has been described previously. An AGC controller 28 receives the phase error signal from the adder 22, and controls the gains of the AGC circuits 26a and 26b, so that the phase error signal from the adder 22 is regulated at a fixed power level.

Figure 3:
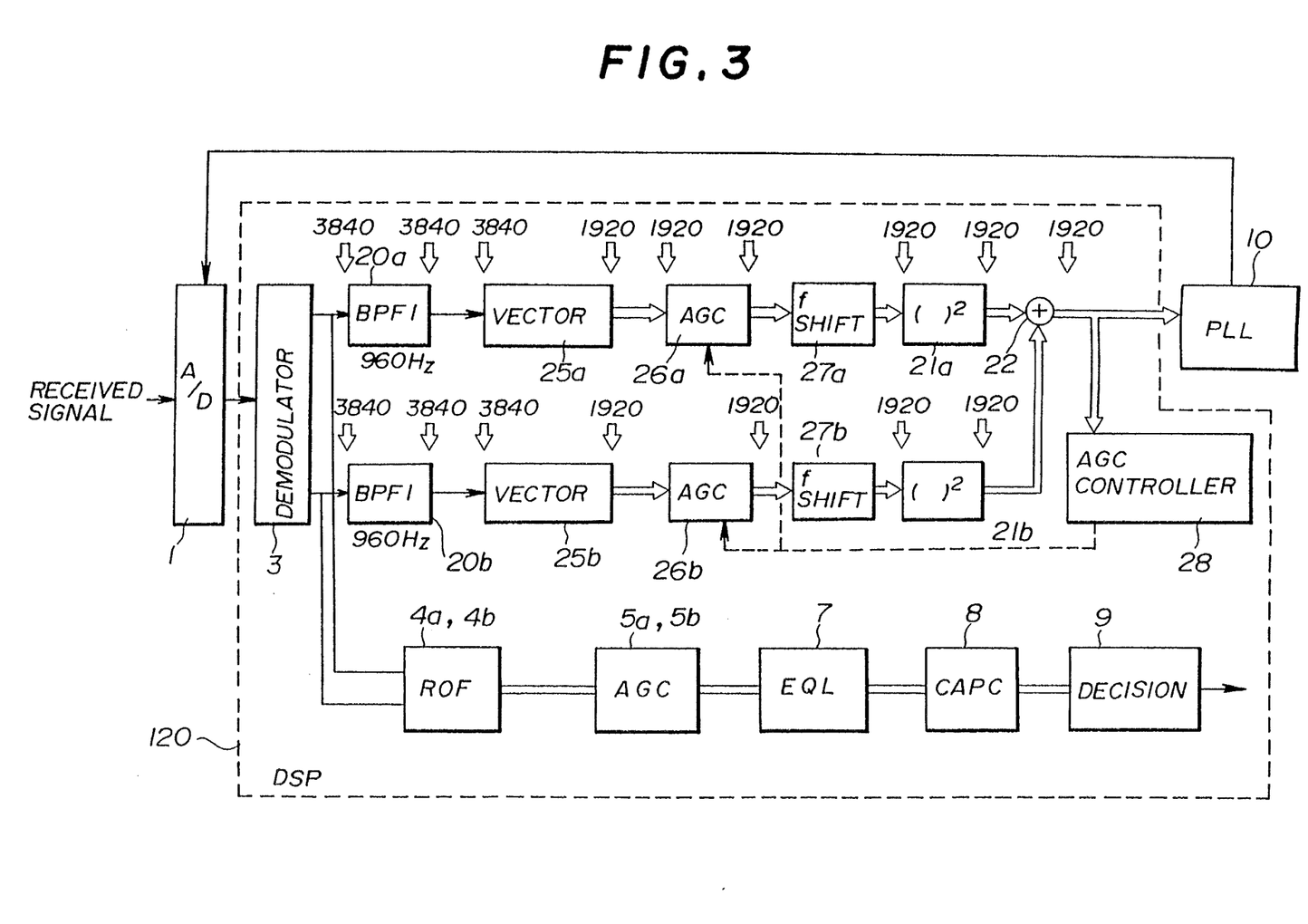
FIG. 3 is a block diagram of a modem according to an embodiment of the present invention.

FIG. 3 is a block diagram of a modem having a timing extractor according to a first embodiment of the present invention. In FIG. 3, parts that are the same as parts shown in FIG. 2A are given the same reference numbers. A DSP 120 including the structural elements shown in FIG. 3 is used. The A/D converter 1 connected to the DSP 120 is connected to the demodulator 3, which is directly connected to the band-pass filters 20a and 20b, and the roll-off filters 4a and 4b. A frequency shifter 27a is connected between the AGC circuit 26a and the square multiplier 21a, and a frequency shifter 27b is connected between the AGC circuit 26b and the square multiplier 21b. It is preferable that the DSP 120 be a floating-point type DSP. The floating-point type DSP does not need the roll-off filters 4a and 4b and the AGC circuits 5a and 5b interposed between the demodulator 3 and the band-pass filters 20a and 20b. In addition, the Q characteristics of the band-pass filters 20a and 20b can be sharped.

Figure 4A:
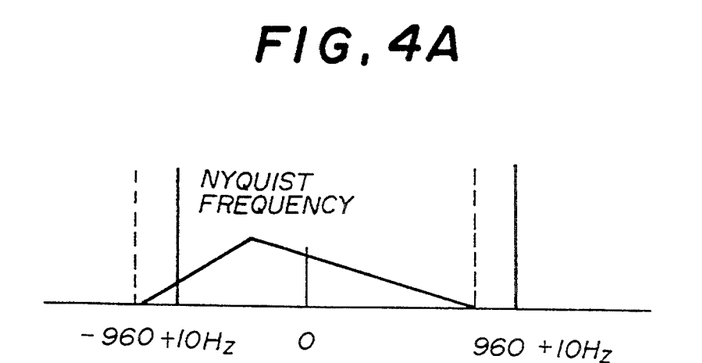
FIGS. 4A, 4B and 4C are frequency spectra showing the operation of the embodiment of the present invention shown in FIG. 3.
Figure 4B:
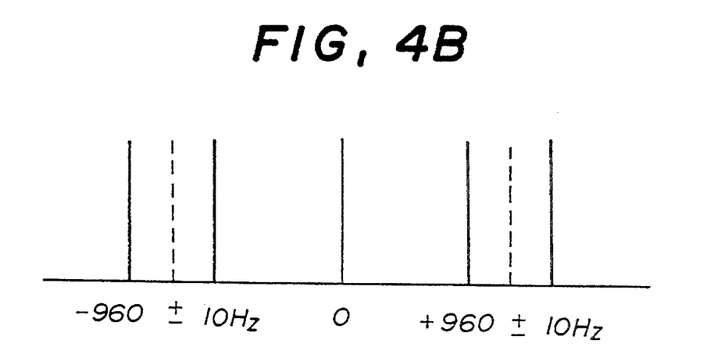
Figure 4C:
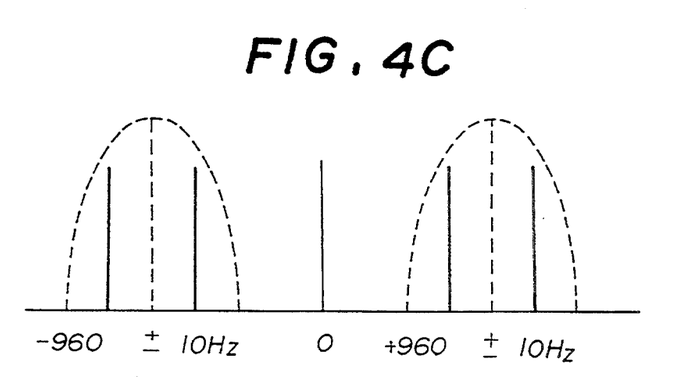

The spectrum of the demodulated signal from the demodulator 3 in the $\pi\pi$ transmission (an offset of +10 Hz) is as shown in FIG. 4A using real and imaginary vectors. As shown in FIG. 4B, the real component has frequency components symmetrical to each other with respect to the origin. Similarly, the imaginary component has frequency components symmetrical to each other with respect to the origin. The band-pass filter 20a extracts the $\frac{1}{2}$-Nyquist frequency (960 Hz) from the real component. The output signal of the band-pass filter 20a is as shown in FIG. 4C. The broken lines in FIG. 4C indicate the filter characteristic of the bandpass filter 20a. The output signal of the band-pass filter 20b is also as shown in FIG. 4C.

The output signals ($\frac{1}{2}$-Nyquist frequency components) of the band-pass filters respectively pass through the AGC circuits 26a and 26b, and are applied to the vector conversion units 25a and 25b, which respectively extract only the positive frequency components therefrom.

Figure 5A:
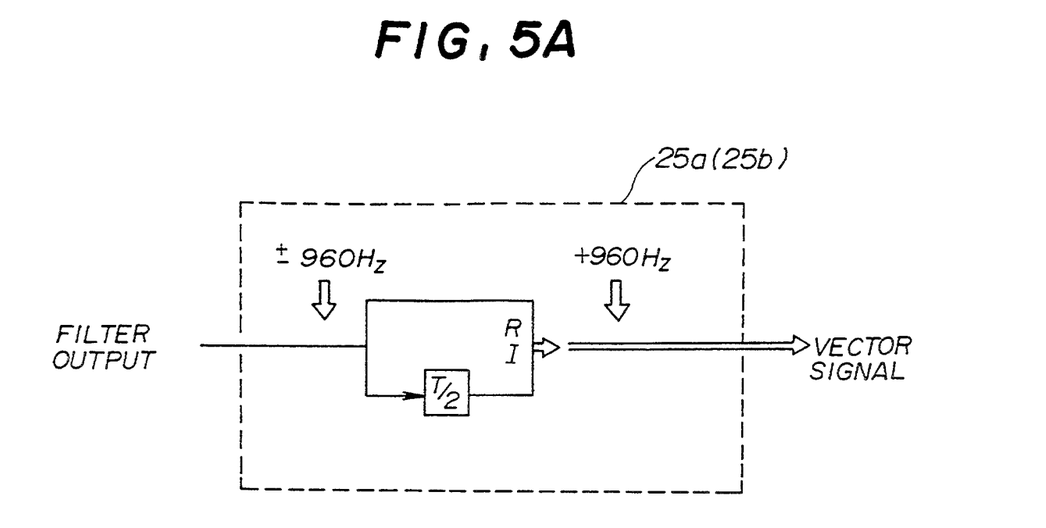
FIG. 5A is a block diagram of a vector conversion unit shown in FIG. 3.
Figure 5B:
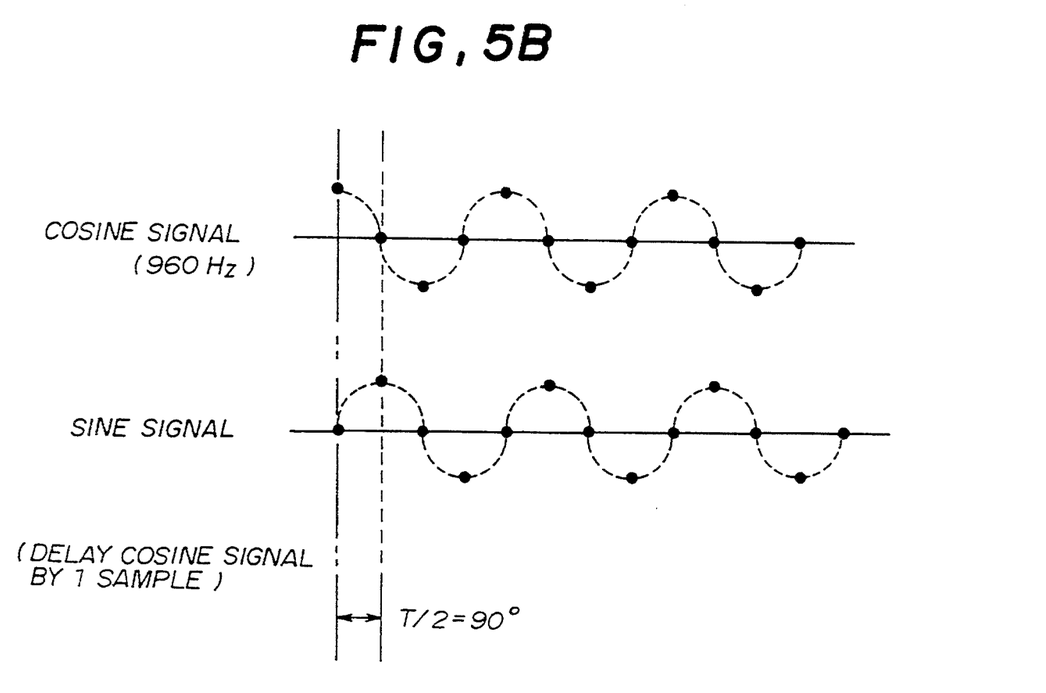
FIG. 5B is a waveform diagram showing the operation of the vector convention unit.
Figure 6A:
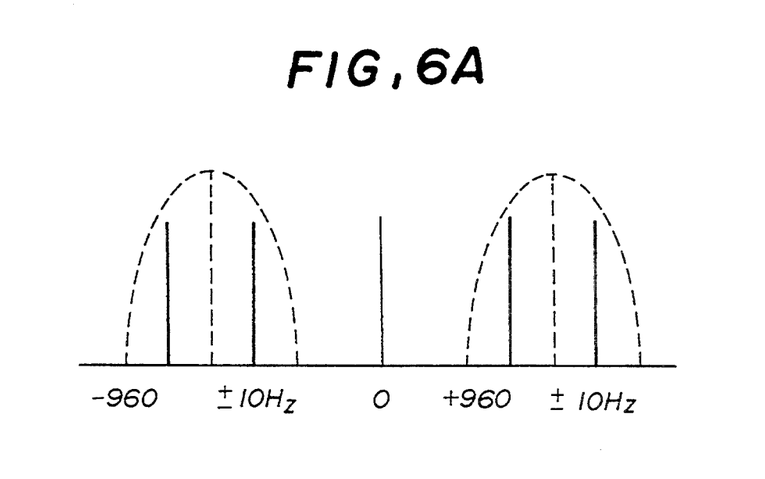
FIGS. 6A and 8B are frequency spectra showing the operation of the vector conversion unit.
Figure 6B:
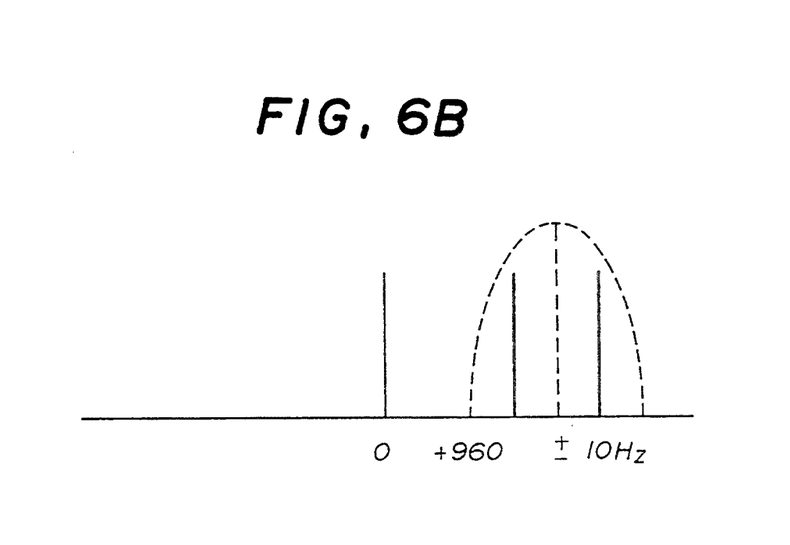

FIG. 5A shows the structure of the vector conversion unit 25a (25b). The vector conversion unit 25a includes a T/2 delay element (where T is a unit delay time), and a bypass line that bypasses the T/2 delay element. The vector conversion unit 25a passes the $\frac{1}{2}$-Nyquist frequency components (±960 Hz), and outputs a cosine signal as shown in FIG. 5B. Further, the vector conversion unit 25a delays the $\frac{1}{2}$-Nyquist frequency components by T/2 (which corresponds to one sample of 1920 Hz), and generates a sine signal shown in FIG. 5B. In this manner, the vector conversion unit 25a converts the scaler signal shown in FIG. 6A into a vector signal $(A(\cos\theta+j\sin\theta)=Ae^{j\theta})$ shown in FIG. 6B. The vector conversion unit 25b operates in the same manner as the vector conversion unit 25a.

In practice, the amplitudes of the vector signals derived from the signals received via different transmission lines are different from each other. With the above in mind, the amplitudes of the output signals of the vector conversion units 25a and 25b are regulated at a fixed level by means of the AGC circuits 26a and 26b. In order to eliminate the influence of a frequency offset or the like, the AGC circuits 26a and 26b are commonly controlled by the AGC controller 28 so that the power of the phase error signal is maintained at a fixed level.

The output signals (+960 Hz) of the AGC circuits 26a and 26b are applied to the frequency shifters 27a and 27b, which shift the frequencies of the output signals of the AGC circuits 26a and 26b to the origin (0 Hz), and generate DC (direct current) signals. Use of the frequency shifters 27a and 27b contributes to a reduction in the quantity of operation by the DSP 120. In principle, the frequency shifters 27a and 27b can be omitted, as shown in FIG. 2A.

Figure 7A:
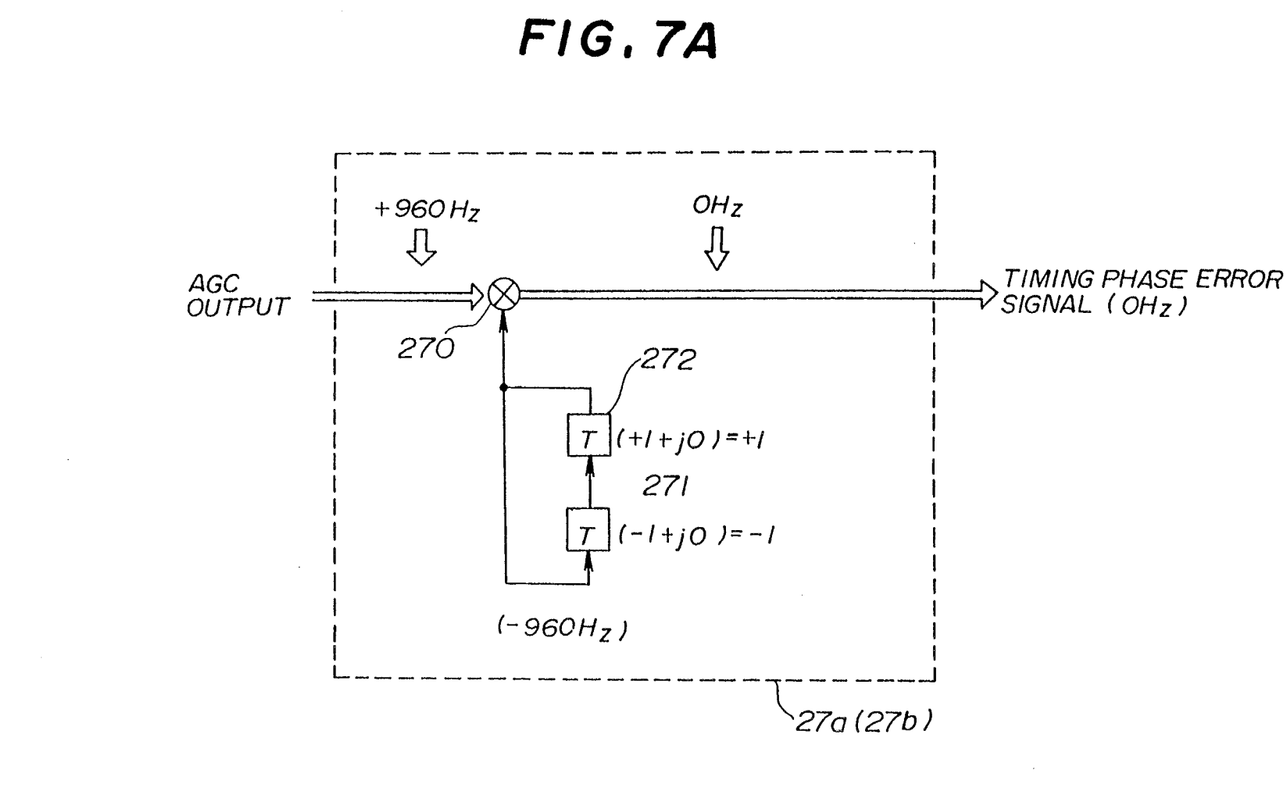
FIG. 7A is a block diagram of a frequency shifter shown in FIG. 3.
Figure 7B:
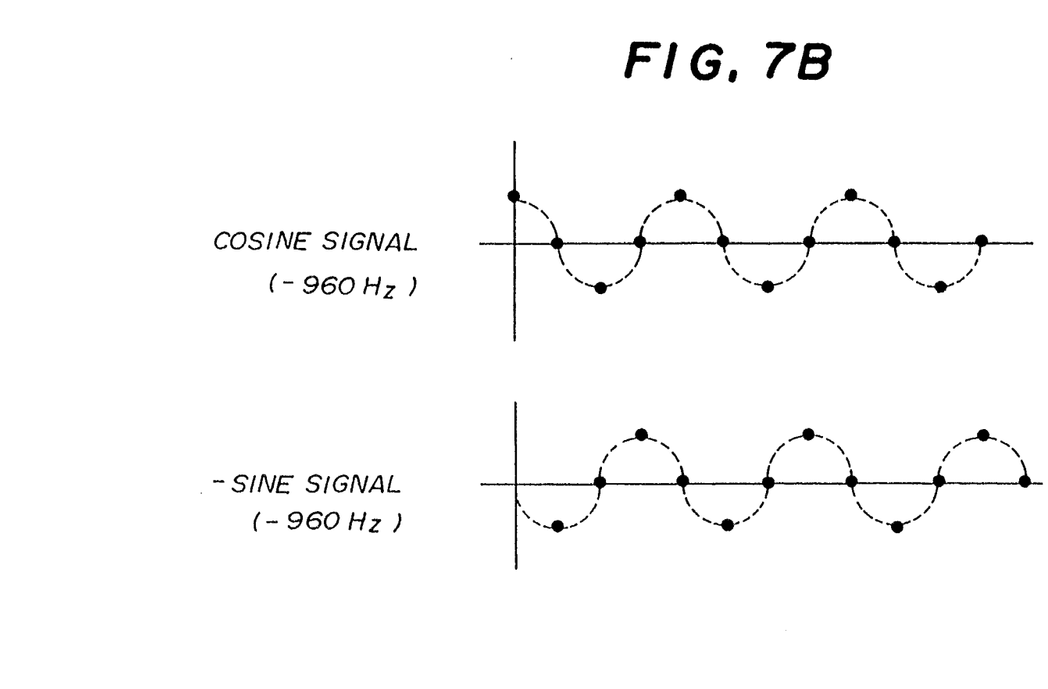
FIG. 7B is a waveform diagram showing the operation of the frequency shifter shown in FIG. 7A.
Figure 8A:
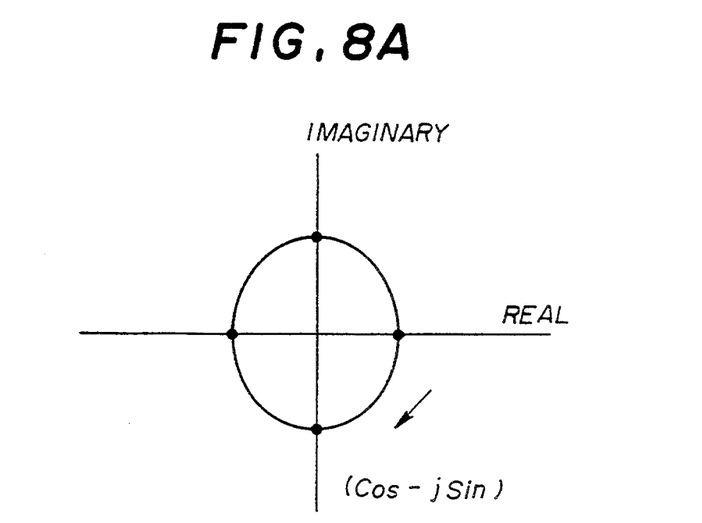
Figure 8B:
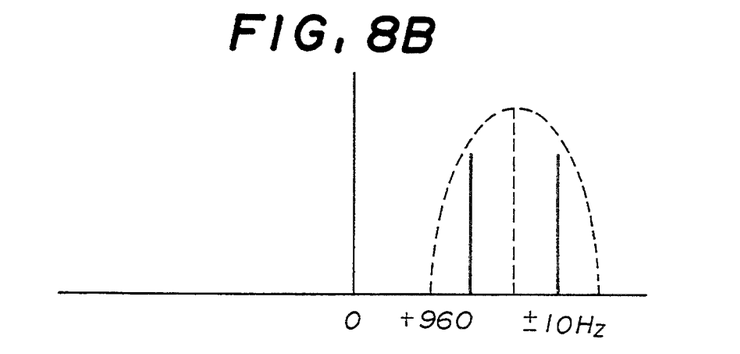
Figure 8C:
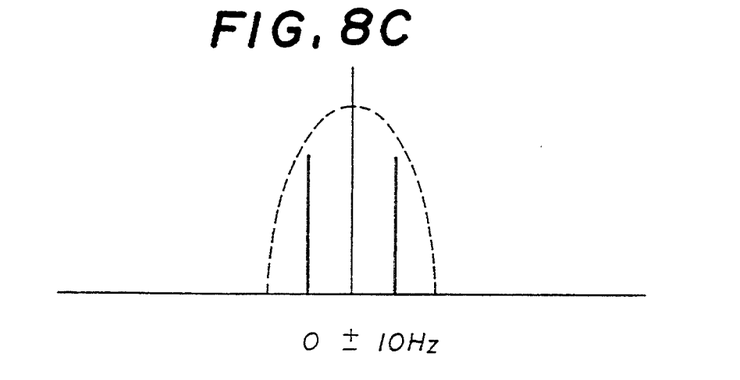

FIG. 7A shows the structure of the frequency shifter 27a (27b). The frequency shifter 27a comprises a multiplier 270, and a series circuit including two delay elements, each having the unit delay time T. The series circuit multiplies the AGC output signal (+960 Hz signal) by a −960 Hz signal $(A(\cos\theta-j\sin\theta))$, as shown in FIG. 7B and FIG. 8A. In this manner, the frequency shifting is carried out, and the frequency component (phase error signal) output by the frequency shifter 27a is converted into the DC signal, as shown in FIG. 8C. Hence, timing information (sampled data) can be obtained one time for one period of the baud rate.

As has been described previously, the essence of timing extraction is not to extract the baud rate frequency itself but to extract a phase error signal at the baud rate. The DC signal output by the frequency shifter 27a does not contain any unnecessary high-frequency signal components. Since the AGC output signals have a frequency equal to half of the baud rate, the AGC output signals are multiplied by values of ±1 (in other words, the AGC output signals are rotated by angles of 0° and 180°) in the frequency shifters 27a and 27b. The above multiplying operation is carried out by the multiplier 270 and the delay elements 271 and 272 (cyclic configuration).

The DC signal is derived from the $\frac{1}{2}$-Nyquist frequency, and hence has a phase indefiniteness of 180° at the baud rate. The phase indefiniteness of the DC signal can be eliminated by squaring the DC signal. The square multiplier 21a squares the DC signal from the frequency shifter 27a, and the square multiplier 21b squares the DC signal from the frequency shifter 27b.

Figure 9:
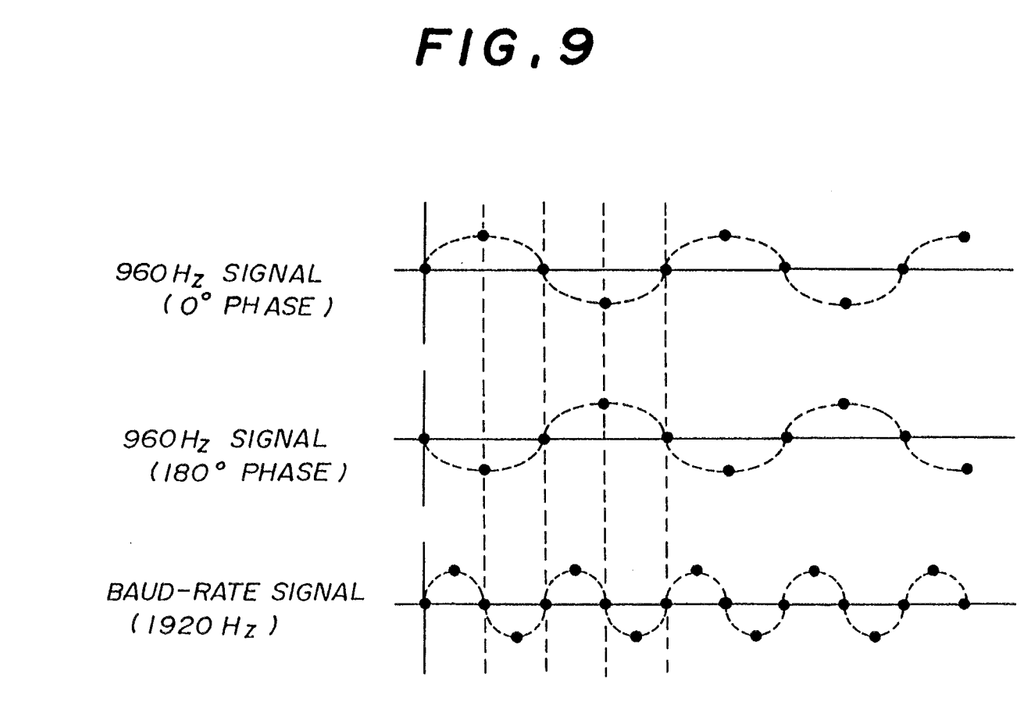
FIG. 9 is a waveform diagram showing a square multiplication process.

FIG. 9 shows the square multiplying process. The $\frac{1}{2}$-Nyquist frequency component $Ae^{j\theta}$ having a frequency of 960 Hz is converted into a signal $A^2e^{j2\theta}$ having an angle twice the angle of the $\frac{1}{2}$-Nyquist frequency component.

Figure 10:
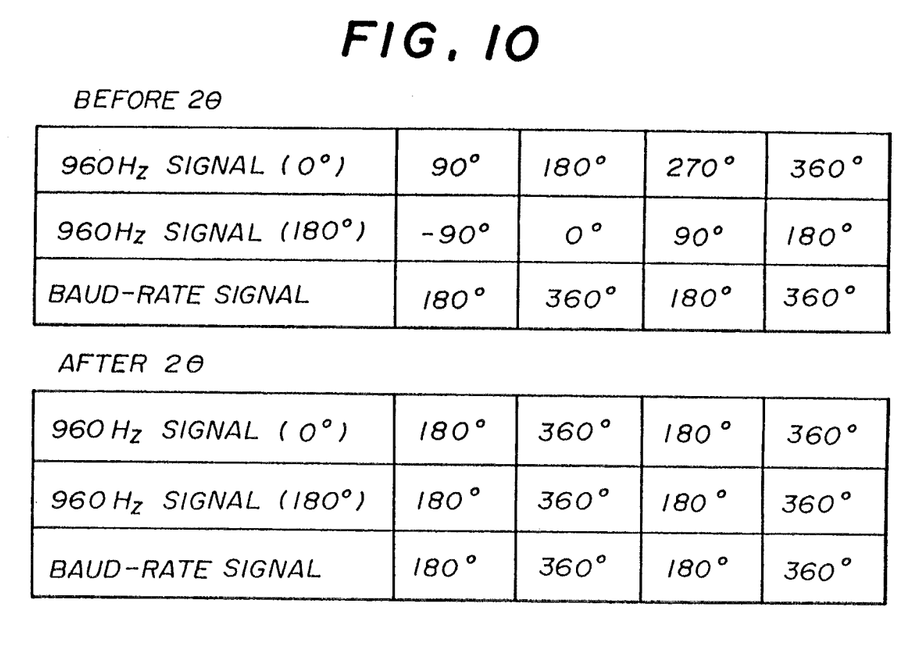
FIG. 10 is a diagram showing the square multiplication process.

FIG. 10 shows two 960 Hz signals to be input to the square multipliers 21a and 21b with respect to the baud-rate signal, and shows two corresponding output signals of the square multiplier 21a and 21b with respect to the baud-rate signal. It can be seen from FIG. 10 that the 180° phase indefiniteness has been eliminated from the output signals of the square multipliers 21a and 21b.

The output signals (the phase error signals) from the square multipliers 21a and 21b are added to each other at the adder 22, which generates the finalized phase error signal obtained for each period of the baud rate 1920 Hz. The finalized phase error signal is applied to the PLL circuit 10 for phase decision. The control signal of the PLL circuit 10 is fed back to the A/D converter 1, and the sampling frequency thereof is adjusted in accordance with the control signal.

Figure 11:
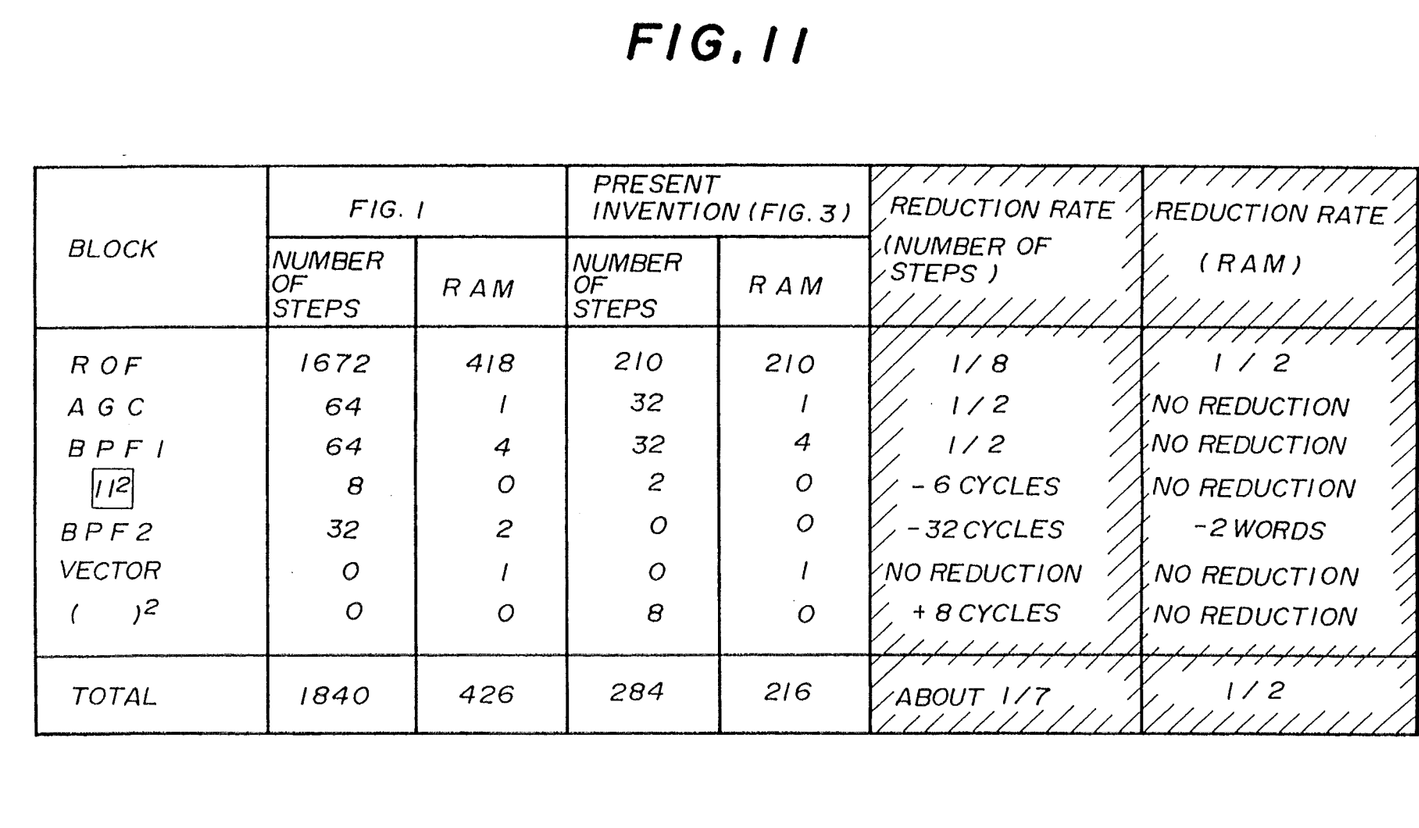
FIG. 11 is a diagram showing the advantages of the present invention.

FIG. 11 shows the advantages of the present invention, compared to the device shown in FIG. 1. The configuration shown in FIG. 1 needs 1672 steps of multiplication and a RAM capacity of 419 bytes in order to configure the roll-off filters 4a and 4b. The configuration of FIG. 3 needs 210 steps of multiplication and a RAM capacity of 210 bytes in order to configure the roll-off filters 4a and 4b. It will be noted that the roll-off filters 4a and 4b shown in FIG. 3 are not used for timing extraction. The configuration shown in FIG. 1 needs 64 steps of multiplication for the AGC processing, while the configuration shown in FIG. 3 needs 32 steps of multiplication for the AGC processing. It will be noted that a frequency equal to four times the baud rate is needed for the AGC processing in the configuration shown in FIG. 1.

The configuration shown in FIG. 1 needs 64 steps of multiplication for the ½-Nyquist filtering process (BPF1) because the process is carried out at a frequency equal to twice the baud rate. The configuration shown in FIG. 1 needs eight steps of multiplication for the square multiplication process, while the configuration in FIG. 3 needs 2 steps of multiplication. The configuration shown in FIG. 1 needs 32 steps of multiplication and a RAM capacity of 2 bytes for the Nyquist filtering process (BPF2). On the other hand, the configuration shown in FIG. 3 does not need the above Nyquist filtering process. The configuration shown in FIG. 3 needs eight steps of multiplication for the squaring multiplication process.

The configuration shown in FIG. 1 needs 1840 steps of multiplication in total, while the configuration shown in FIG. 3 needs 284 steps of multiplication in total. That is, the latter is approximately one seventh of the former. Hence, the number of DSPs to be used can be greatly reduced according to the present invention. The configuration shown in FIG. 1 needs a RAM capacity of 426 bytes, while the configuration shown in FIG. 3 needs a RAM capacity of 216 bytes in total. That is, the latter is approximately half of the former.

The present invention is not limited to the specifically described embodiments, and variations and modifications may be made without departing from the scope of the present invention.

What is claimed is:

1. A timing extraction device coupled to a demodulator which derives a real signal component and an imaginary signal component from a signal received from a transmission line via an A/D converter, said timing extraction device comprising:
   first means for extracting a ½-Nyquist frequency from at least one of the real signal component and the imaginary signal component, said ½-Nyquist frequency including two symmetrical frequency components;
   second means, coupled to said first means, for processing the ½-Nyquist frequency extracted by said first means so that a vector signal corresponding to one of the two symmetrical frequency components of the ½-Nyquist frequency is output from said second means;
   third means, coupled to said second means, for squaring the vector signal output from said second means and thereby generating a phase error signal indicating timing information concerning the signal received via the transmission line, the phase error signal having an angle equal to an angle obtained by squaring the vector signal; and
   means for receiving said phase error signal and being coupled to said A/D converter for adjusting a sampling frequency of said A/D converter.

2. The timing extraction device as claimed in claim 1, further comprising fourth means, provided between said second means and said third means, for regulating a gain of the vector signal at a fixed level on the basis of the phase error signal.

3. A timing extraction device coupled to a demodulator which derives a real signal component and an imaginary signal component from a signal received from a transmission line via an A/D converter, said timing extraction device comprising:
   first means for extracting a ½-Nyquist frequency from at least one of the real signal component and the imaginary signal component, said ½-Nyquist frequency including two symmetrical frequency components;
   second means, coupled to said first means, for processing the ½-Nyquist frequency extracted by said first means so that a vector signal corresponding to one of the two symmetrical frequency components of the ½-Nyquist frequency is output from said second means;
   third means, coupled to said second means, for squaring the vector signal output from said second means and thereby generating a phase error signal indicating timing information concerning the signal received from the transmission line, the phase error signal having an angle equal to an angle obtained by squaring the vector signal;
   means for receiving said phase error signal and being coupled to said A/D converter for adjusting a sampling frequency of said A/D converter; and
   fourth means, provided between said second means and said third means, for shifting a frequency of the vector signal so that the vector signal is converted into a DC signal.

4. A timing extraction device coupled to a demodulator which derives a real signal component and an imaginary signal component from a signal received from a transmission line via an A/D converter, said timing extraction device comprising:
   first means for extracting a ½-Nyquist frequency from at least one of the real signal component and the imaginary signal component, said ½-Nyquist frequency including two symmetrical frequency components;
   second means, coupled to said first means, for processing the ½-Nyquist frequency extracted by said first means so that a vector signal corresponding to one of the two symmetrical frequency components of the ½-Nyquist frequency is output from said second means;
   third means, coupled to said second means, for squaring the vector signal from said second means and thereby generating a phase error signal indicating timing information concerning the signal received from the transmission line, the phase error signal having an angle equal to an angle obtained by squaring the vector signal;

means for receiving said phase error signal and being coupled to said A/D converter for adjusting a sampling frequency of said A/D converter;

fourth means, provided between said second means and said third means, for shifting a frequency of the vector signal so that the vector signal is converted into a DC signal; and fifth means, provided between said second means and said fourth means, for regulating a gain of the vector signal at a fixed level on the basis of the phase error signal.

5. A timing extraction device coupled to a demodulator which derives a real signal component and an imaginary signal component from a signal received from a transmission line via an A/D converter, said timing extraction device comprising:

first means for extracting a first ½-Nyquist frequency from the real signal component and a second 1/2 Nyquist frequency from the imaginary signal component, each of said first and second ½-Nyquist frequencies including two symmetrical frequency components;

second means, coupled to said first means, for processing the first and second ½-Nyquist frequencies extracted by said first means so that first and second vector signals, each corresponding to one of the two symmetrical frequency components of the ½-Nyquist frequencies are output from said second means;

third means, coupled to said second means, for squaring the first and second vector signals and generating first and second phase error signals respectively indicating timing information concerning the signal received from the transmission line, the first and second phase error signals respectively having angles each being equal to an angle obtained by squaring the first and second vector signals, respectively;

fourth means, coupled to said third means, for adding the first and second phase error signals to each other and thereby generating a finalized phase error signal; and means for receiving said finalized phase error signal and being coupled to said A/D converter for adjusting a sampling frequency thereof.

6. The timing extraction device as claimed in claim 5, further comprising fifth means, provided between said second means and said third means, for regulating gains of the first and second vector signals at a fixed level on the basis of the finalized phase error signal.

7. A data transmission device coupled to a demodulator which derives a real signal component and an imaginary signal component from a signal received from a transmission line via an A/D converter, said timing extraction device comprising:

first means for extracting a first ½-Nyquist frequency from the real signal component and a second ½-Nyquist frequency from the imaginary signal component, each of said ½-Nyquist frequencies including two symmetrical frequency components;

second means, coupled to said first means, for processing the first and second ½-Nyquist frequencies extracted from said first means so that first and second vector signals, each corresponding to one of the two symmetrical frequency components of the ½-Nyquist frequencies, are output from said second means;

third means, coupled to said second means, for squaring the first and second vector signals and thereby generating first and second phase error signals respectively indicating timing information concerning the signal received from the transmission line, each of the first and second phase error signals respectively having an angle equal to an angle obtained by squaring the first and second vector signals, respectively;

fourth means, coupled to said third means, for adding the first and second phase error signals to each other and thereby generating a finalized phase error signal;

means for receiving said finalized phase error signal and being coupled to said A/D converter for adjusting a sampling frequency thereof; and fifth means, provided between said second means and said third means, for shifting frequencies of the first and second vector signals so that the first and second vector signals are respectively converted into DC signals.

8. A timing extraction device coupled to a demodulator which derives a real signal component and an imaginary signal component from a signal received from a transmission line via an A/D converter, said timing extraction device comprising:

first means for extracting a first ½-Nyquist frequency from the real signal component and a second ½-Nyquist frequency from the imaginary signal component, each of said ½-Nyquist frequencies including two symmetrical frequency components;

second means, coupled to said first means, for processing the first and second ½-Nyquist frequencies extracted from said first means so that first and second vector signals, each corresponding to one of the two symmetrical frequency components of the ½-Nyquist frequencies, are output from said second means;

third means, coupled to said second means, for squaring the first and second vector signals and thereby generating first and second phase error signals respectively indicating timing information concerning the signal received from the transmission line, each of the first and second phase error signals respectively having an angle equal to an angle obtained by squaring the first and second vector signals, respectively;

fourth means, coupled to said third means, for adding the first and second phase error signals to each other and thereby generating a finalized phase error signal;

means for receiving said finalized phase error signal and being coupled to said A/D converter for adjusting a sampling frequency thereof;

fifth means, provided between said second means and said third means, for shifting frequencies of the first and second vector signals so that the first and second vector signals are converted into DC signals; and sixth means, provided between said second means and said fourth means, for regulating gains of the first and second vector signals at a fixed level on the basis of the finalized phase error signal.

9. A data transmission device comprising:

an A/D converter for converting an analog signal received via a transmission line into a digital signal;

a timing extraction device coupled to a demodulator which derives a real signal component and an imaginary signal component from the digital signal, said timing extraction device generating a phase error signal;

a controller for adjusting a sampling frequency of the A/D converter on the basis of the phase error signal; and a data reproducing system for reproducing original data from the real signal component and the imaginary signal component, said timing extraction device comprising:

first means for extracting a ½-Nyquist frequency from at least one of the real signal component and the imaginary signal component, said ½-Nyquist frequency including two symmetrical frequency components;

second means, coupled to said first means, for processing the ½-Nyquist frequency extracted by said first means so that a vector signal corresponding to one of the two symmetrical frequency components of the ½-Nyquist frequency is output from said second means; and third means, coupled to said second means, for squaring the vector signal output from said second means and thereby generating said phase error signal indicating timing information concerning the analog signal, the phase error signal having an angle equal to a double an angle obtained by squaring the vector signal.

10. The data transmission device as claimed in claim 9, further comprising fourth means, provided between said second means and said third means, for regulating a gain of the vector signal at a fixed level on the basis of the phase error signal.

11. A data transmission device comprising:

an A/D converter for converting an analog signal received via a transmission line into a digital signal;

a timing extraction device coupled to a demodulator which derives a real signal component and an imaginary signal component from the digital signal, said timing extraction device generating a phase error signal;

a controller for adjusting a sampling frequency of the A/D converter on the basis of the phase error signal; and a data reproducing system for reproducing original data from the real signal component and the imaginary signal component, said timing extraction device comprising:

first means for extracting a ½-Nyquist frequency from at least one of the real signal component and the imaginary signal component, said ½-Nyquist frequency including two symmetrical frequency components;

second means, coupled to said first means, for processing the ½-Nyquist frequency so that a vector signal corresponding to one of the two symmetrical frequency components of the ½-Nyquist frequency is output from said second means;

third means, coupled to said second means, for squaring the vector signal output from said second means and thereby generating said phase error signal indicating timing information concerning the analog signal, the phase error signal having an angle equal to an angle obtained by squaring the vector signal; and fourth means, provided between said second means and said third means, for shifting a frequency of the vector signal so that the vector signal is converted into a DC signal.

12. A data transmission device comprising:

an A/D converter for converting an analog signal received via a transmission line into a digital signal;

a timing extraction device coupled to a demodulator which derives a real signal component and an imaginary signal component from the digital signal, said timing extraction device generating a phase error signal;

a controller for adjusting a sampling frequency of the A/D converter on the basis of the phase error signal; and a data reproducing system for reproducing original data from the real signal component and the imaginary signal component, said timing extraction device comprising:

first means for extracting a ½-Nyquist frequency from at least one of the real signal component and the imaginary signal component, said ½-Nyquist frequency including two symmetrical frequency components;

second means, coupled to said first means, for processing the ½-Nyquist frequency so that a vector signal corresponding to one of the two symmetrical frequency components of the ½-Nyquist frequency is output from said second means;

third means, coupled to said second means, for squaring the vector signal output from said second means and thereby generating said phase error signal indicating timing information concerning the analog signal, the phase error signal having an angle equal to an angle obtained by squaring the vector signal;

fourth means, provided between said second means and said third means, for shifting a frequency of the vector signal so that the vector signal is converted into a DC signal; and fifth means, provided between said second means and said fourth means, for regulating a gain of the vector signal at a fixed level on the basis of the phase error signal.

13. A data transmission device comprising:

an A/D converter for converting an analog signal received via a transmission line into a digital signal;

a timing extraction device coupled to a demodulator which derives a real signal component and an imaginary signal component from the digital signal, said timing extraction device generating a finalized phase error signal;

a controller for adjusting a sampling frequency of the A/D converter on the basis of the finalized phase error signal; and a data reproducing system for reproducing original data from the real signal component and the imaginary signal component, said timing extraction device comprising:

first means for extracting a first ½-Nyquist frequency from the real signal component and a second ½-Nyquist frequency from the imaginary signal component, each of said ½-Nyquist frequencies including two symmetrical frequency components;

second means, coupled to said first means, for processing the first and second ½-Nyquist frequencies extracted by said first means so that first and second vector signals, each corresponding to one of the two symmetrical frequency components of the ½-Nyquist frequencies are output from said second means;

third means, coupled to said second means, for squaring the first and second vector signals and thereby generating first and second phase error signals respectively indicating timing information concerning the analog signal, each of the first and second phase error signals respectively having an angle equal to an angle obtained by squaring the first and second vector signals, respectively; and fourth means, coupled to said third means, for adding the first and second phase error signals to each other and thereby generating said finalized phase error signal.

14. The data transmission device as claimed in claim 13, further comprising fifth means, provided between said second means and said third means, for regulating gains of the first and second vector signals at a fixed level on the basis of the finalized phase error signal.

15. A data transmission device comprising:

an A/D converter for converting an analog signal received via a transmission line into a digital signal;

a timing extraction device coupled to a demodulator which derives a real signal component and an imaginary signal component from the digital signal, said timing extraction device generating a finalized phase error signal;

a controller for adjusting a sampling frequency of the A/D converter on the basis of the finalized phase error signal; and a data reproducing system for reproducing original data from the real signal component and the imaginary signal component, said timing extraction device comprising:

first means for extracting a first ½-Nyquist frequency from the real signal component and a second ½-Nyquist frequency from the imaginary signal component, each of said ½-Nyquist frequencies including two symmetrical frequency components;

second means, coupled to said first means, for processing the first and second ½-Nyquist frequencies extracted by said first means so that first and second vector signals, each corresponding to one of the two symmetrical frequency components of the ½-Nyquist frequencies are output from said second means;

third means, coupled to said second means, for squaring the first and second vector signals and thereby generating first and second phase error signals respectively indicating timing information concerning the analog signal, each of the first and second phase error signals respectively having an angle equal to an angle obtained by squaring of the first and second vector signals, respectively;

fourth means, coupled to said third means, for adding the first and second phase error signals to each other and thereby generating said finalized phase error signal; and fifth means, provided between said second means and said third means, for shifting frequencies of the first and second vector signals so that the first and second vector signals are respectively converted into DC signals.

16. A data transmission device comprising:

an A/D converter for converting an analog signal received via a transmission line into a digital signal;

a timing extraction device coupled to a demodulator which derives a real signal component and an imaginary signal component from the digital signal, said timing extraction device generating a finalized phase error signal;

a controller for adjusting a sampling frequency of the A/D converter on the basis of the finalized phase error signal; and a data reproducing system for reproducing original data from the real signal component and the imaginary signal component, said timing extraction device comprising:

first means for extracting a first ½-Nyquist frequency from the real signal component and a second ½-Nyquist frequency from the imaginary signal component, each of said ½-Nyquist frequencies including two symmetrical frequency components;

second means, coupled to said first means, for processing the first and second ½-Nyquist frequencies extracted by said first means so that first and second vector signals, each corresponding to one of the two symmetrical frequency components of the ½-Nyquist frequencies are output from said second means;

third means, coupled to said second means, for squaring the first and second vector signals and thereby generating first and second phase error signals respectively indicating timing information concerning the analog signal, each of the first and second phase error signals respectively having an angle equal to an angle obtained by squaring the first and second vector signals, respectively;

fourth means, coupled to said third means, for adding the first and second phase error signals to each other and thereby generating said finalized phase error signal;

fifth means, provided between said second means and said third means, for shifting frequencies of the first and second vector signals so that the first and second vector signals are converted into DC signals; and sixth means, provided between said second means and said fourth means, for regulating gains of the first and second vector signals at a fixed level on the basis of the finalized phase error signal.

* * * * *